United States Patent
Choi et al.

(10) Patent No.: US 12,534,246 B2
(45) Date of Patent: Jan. 27, 2026

(54) REFILL SYSTEM AND SPOUT AND METHODS OF USING THE SAME

(71) Applicant: SILGAN DISPENSING SYSTEMS CORPORATION, Grandview, MO (US)

(72) Inventors: Daniel Choi, Richmond, VA (US); Brandon Ramsuer, Richmond, VA (US); Jacob Vanbecelaere, Olathe, KS (US); Peter Beegle, Midlothian, VA (US); Stefan Koster, Rotterdam (NL)

(73) Assignee: Silgan Dispensing Systems Corporation, Richmond, VA (US)

( * ) Notice: Subject to any disclaimer, the term of this patent is extended or adjusted under 35 U.S.C. 154(b) by 0 days.

(21) Appl. No.: 18/704,724

(22) PCT Filed: Nov. 14, 2022

(86) PCT No.: PCT/US2022/049764
§ 371 (c)(1),
(2) Date: Apr. 25, 2024

(87) PCT Pub. No.: WO2023/086608
PCT Pub. Date: May 19, 2023

(65) Prior Publication Data
US 2025/0002189 A1  Jan. 2, 2025

Related U.S. Application Data

(60) Provisional application No. 63/279,271, filed on Nov. 15, 2021.

(51) Int. Cl.
*B65B 39/00* (2006.01)
*B67C 11/02* (2006.01)

(52) U.S. Cl.
CPC .............. *B65B 39/00* (2013.01); *B67C 11/02* (2013.01)

(58) Field of Classification Search
CPC ................................ B65B 39/00; B67C 11/00
See application file for complete search history.

(56) References Cited

U.S. PATENT DOCUMENTS

| | | | |
|---|---|---|---|
| 5,497,892 A * | 3/1996 | Takatsuki | A47J 31/50 215/307 |
| 6,142,193 A | 11/2000 | Sanders | |
| 8,875,754 B2 | 11/2014 | Eyre | |
| 8,925,593 B2 | 1/2015 | Lamboux | |
| 9,085,397 B2 | 7/2015 | Maas | |
| 10,429,225 B2 * | 10/2019 | Warren | G01F 19/002 |
| 11,008,208 B2 | 5/2021 | Matsumoto et al. | |

FOREIGN PATENT DOCUMENTS

| | | |
|---|---|---|
| CN | 103552754 | 2/2014 |
| JP | 2018-203312 | 12/2018 |

* cited by examiner

*Primary Examiner* — Timothy L Maust
(74) *Attorney, Agent, or Firm* — Hinckley Allen & Snyder; Stephen Holmes

(57) ABSTRACT

A refill closure system to be used with bulk refill containers and targeted refill bottles in which the closure system includes a pour cap and a funnel, the funnel being sealed to the pour cap in a closed or non-use state and detached from the pour cap in a use state wherein the funnel may be inserted in a targeted refill bottle to facilitate filling of the targeted refill bottle from a bulk refill container.

20 Claims, 8 Drawing Sheets

REFILL SYSTEM AND SPOUT AND METHODS OF USING THE SAME

BACKGROUND OF THE INVENTION

Field of the Invention

Embodiments of the invention relate to refill systems and more particularly to refill systems including a spout and a funnel system capable of sealing a refill container while providing an improved receptacle for refilling a second container.

Description of Related Art

A desire for sustainability, reduced waste, and recycling has driven consumer products makers to develop, commercialize, and promote the use of refill systems for any number of products. For example, soap dispensers that were once sold as a bottle with a throw-away pump attached thereto are now sold as a container and pump combination, wherein the container may be separated from the pump, refilled, and then reattached to the pump such that both the container and the pump may be reused multiple times. In addition, refill bottles, containing larger amounts of product, are sold so that users and consumers may refill their pump systems on their own. The increased size of the refill bottles—and ability to provide multiple refills in a single package—reduces the amount of generated waste per unit or per amount of product.

Although refill systems have become prevalent in many different consumer goods categories, the consumer experience using the refills has not improved. In the simplest form, a refill bottle may include a cap that is removed from the refill bottle and product is then poured out of the refill bottle directly into a product container or bottle to which a pump, cap, or other dispenser will be attached for everyday use. As many users have experienced, refilling daily use bottles or containers from a larger refill bottle can be messy and difficult, especially when the openings in either the daily use bottle or refill bottle are narrow or small.

To improve the refill experience, some brands include a closure on their refill bottles. The closure may consist of a two-part cap in which a closure part closes or seals a hole through which the refill product may be poured. The hole or opening through which the refill product exits the refill bottle may be smaller in diameter or size than the target daily use bottle opening so that a smaller fluid flow can be directed into the daily use bottle. While such systems sometimes reduce waste or spillage, there are still issues because venting is often reduced or eliminated, requiring alternative venting actions during the refill process. This can lead to longer refill times. In some cases, users will revert to a larger opening by removing the closure and pouring directly from the refill bottle as with the original and simpler systems, which may result in greater mess and complications during refilling procedures.

While refill systems have issues, the drive to increase sustainability of packaging products and reducing waste will no doubt lead to the continued use of—and likely an increased use of—refill systems. Therefore, improved refill systems capable of providing an improved or better consumer experience are desired.

BRIEF SUMMARY OF THE INVENTION

According to certain embodiments of the invention, a refill system may include a closure system including a pour cap for a refill bottle and a funnel capable of being attached to the pour cap to seal one or more openings in the pour cap and being removed from the pour cap and seated in a daily-use bottle or container to provide a larger diameter or larger area through which refill product may be poured into the daily use bottle or container. The closure may be attached to a bottle or container in which a product or liquid is stored.

In some embodiments of the invention, a closure may include a funnel with an external surface having a thread thereon and a pour cap having an internal surface with a corresponding thread into which the funnel may be threaded or screwed to secure the funnel to the pour cap. The funnel, the pour cap, or both may include seals or other features to ensure that product cannot escape the refill bottle when the funnel is secured to the pour cap.

In other embodiments, a funnel and pour cap may include a snap system allowing the funnel to be snapped together with the pour cap to close and seal the refill system and unsnapped from the pour cap to allow product to be dispensed from the refill system. The funnel, the pour cap, or both may include seals or other features to ensure that product cannot escape the refill bottle when the funnel is secured to the pour cap.

In still other embodiments of the invention, a funnel may include a closure skirt extending off an exterior surface of the funnel. Threads, snaps, bayonet systems, or other closure features may be associated with the closure skirt an may interact with similar features on an exterior surface of the pour cap to facilitate the combination of the funnel with the pour cap.

In some embodiments of the invention, a closure may include multiple openings through which product may flow during the dispensing of a refill product from a refill container. In addition, at least one of the multiple openings may act as a vent, allowing air to flow into the refill bottle or container such that a user need not stop pouring the refill product to vent the bottle as is common with existing refill closure caps.

In various embodiments of the invention, a funnel may include a first opening and a second opening wherein the second opening is larger than the first opening. The first opening may include a seal that may interact with a feature on the pour cap to seal the funnel to the pour cap. For example, a pour cap may have a funnel closure projection over which the first opening of the funnel may fit and the funnel may seal against the funnel closure projection to close or seal the funnel and the pour cap together.

Various embodiments of the invention may be used to refill a daily use bottle or container. In use, a refill system is provided including a container, a refill product stored in the container, and a closure system according to various embodiments of the invention. A daily use bottle or container into which the refill product is to be transferred is also provided, wherein the daily use bottle or container includes an opening through which the refill product is to be dispensed. The funnel of the closure system is removed from the pour cap. Removal may be accomplished using the method required for the given closure system: unscrewing threaded connections, unsnapping snap connections, twisting and pulling bayonet connection systems, or otherwise separating the funnel from the pour cap. The funnel may then be placed in the opening in the daily use bottle or container with the narrower end inserted into the daily use bottle or container. The refill bottle may be tipped to dispense refill product from the refill container through the pour cap and into the funnel. In some embodiments, openings in the pour cap allow the refill container to vent during the dispensing process. Once the daily use bottle or container is filled to the level desired by the user, the refill container may be brought back to a rest position, the funnel removed from the daily use bottle or container, and the funnel replaced on the pour cap and secured thereto.

BRIEF DESCRIPTION OF THE SEVERAL VIEWS OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

According to various embodiments of the invention, a closure system 100 includes a pour cap 110 and a funnel 200. The funnel 200 may be separated from the pour cap 110 as illustrated in FIG. 1 or attached to each other in an assembled state.

Figure 1:
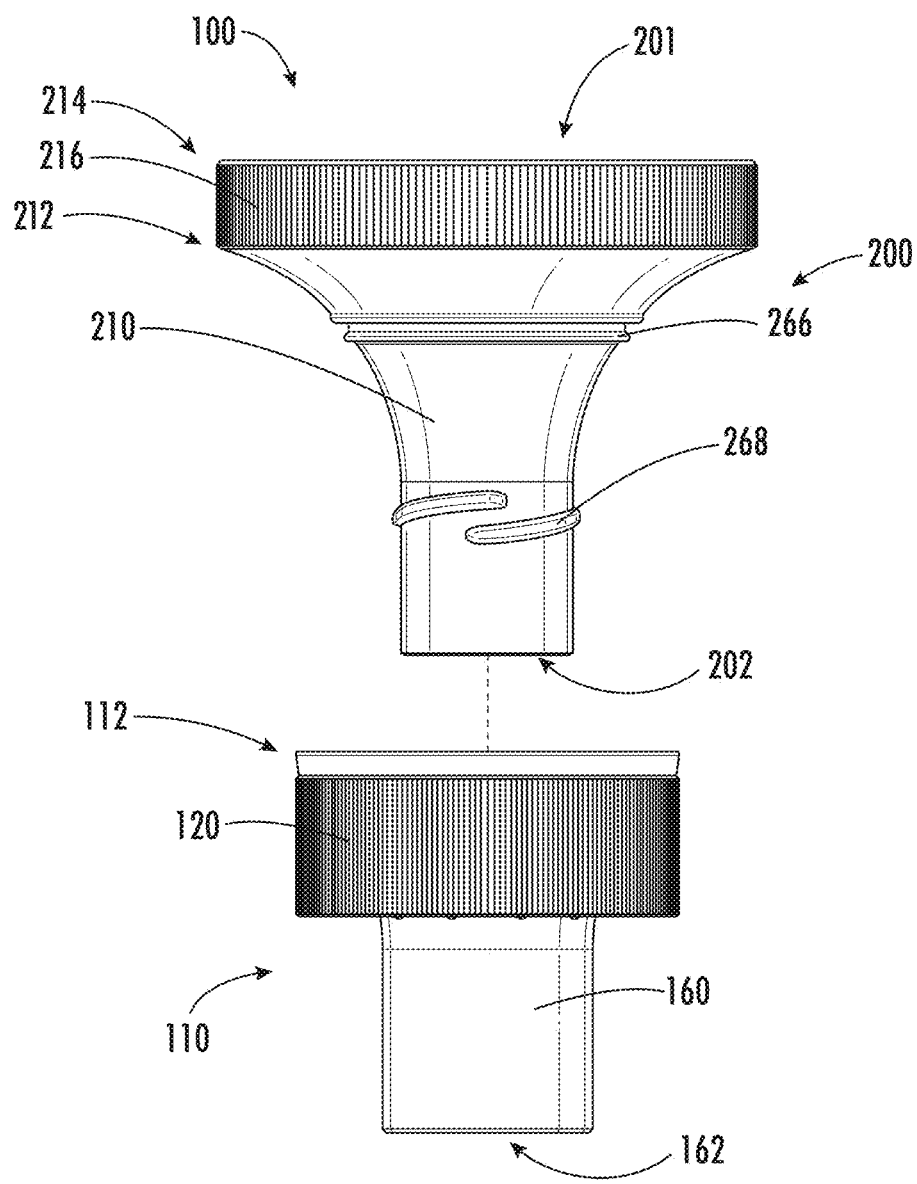
FIG. 1 illustrates a closure system according to various embodiments of the invention.
Figure 2:
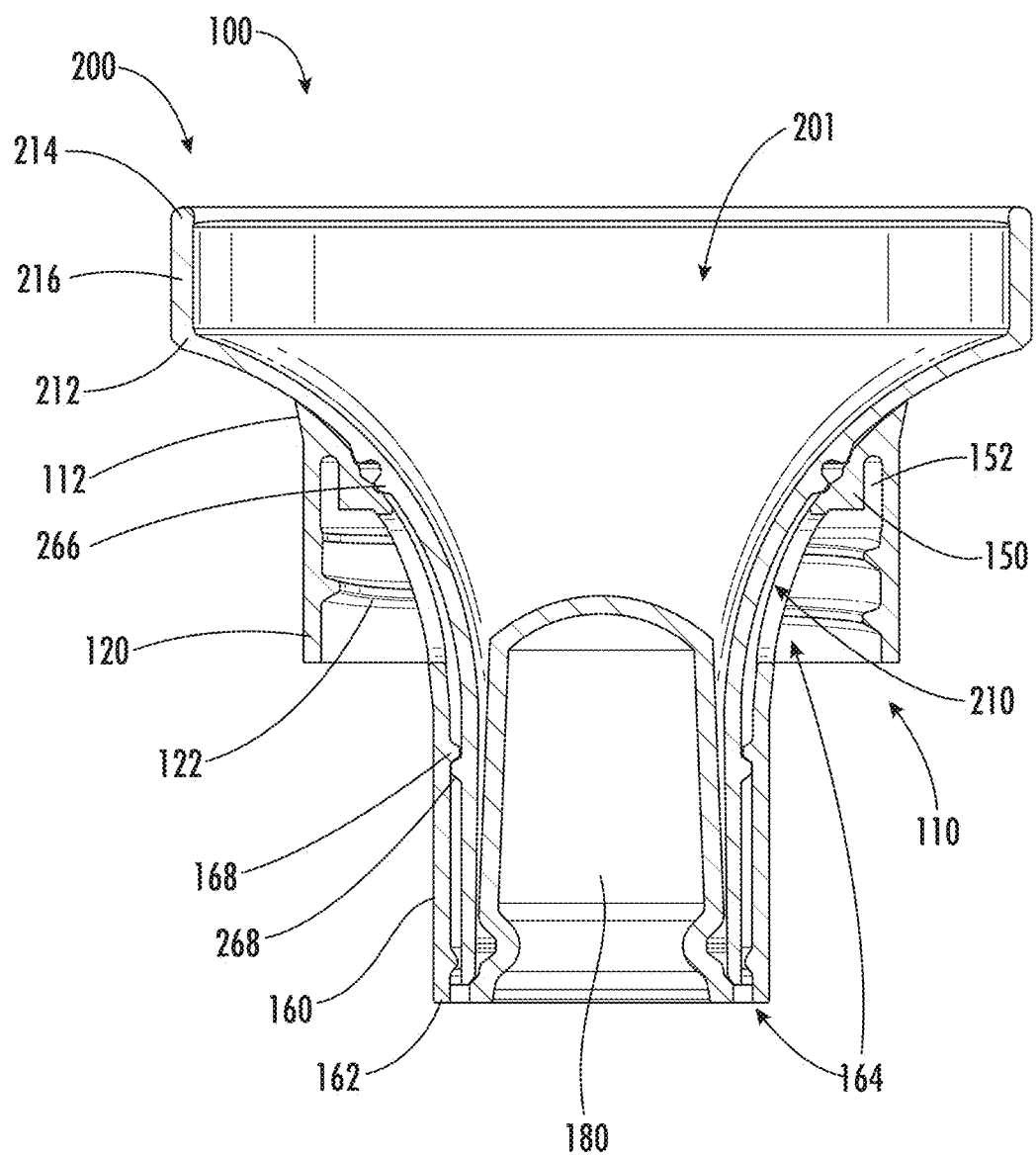
FIG. 2 illustrates a cross-sectional view of the closure system illustrated in FIG. 1 in an assembled state.

The closure system 100 illustrated in FIG. 1 includes a pour cap 110 and a funnel 200. The pour cap 110 embodiments shown in FIGS. 1 and 2 include a pour cap 110 having a top edge 112 with a closure skirt 120 extending away from the top edge 112 as illustrated. According to certain embodiments of the invention, the closure skirt 120 may be generally circular or conical in shape, defining an interior space within the pour cap 110. A funnel skirt 160 may also extend away from the top edge 112 or off a portion of the closure skirt 120 into the interior space. An exterior surface of the funnel skirt 160 may face an internal surface of the closure skirt 120. As illustrated, the funnel skirt 160 does not include a constant diameter, instead having a reducing conical shape with curvature selected to generally mirror the surface of, or mate with, a funnel 200 according to various embodiments of the invention. At a termination of the funnel skirt 160 is a bottom surface 162. The bottom surface 162 may include a generally solid surface perpendicular to the funnel skirt 160 walls at the intersection thereof. One or more pour openings 164 may perforate the bottom surface 162, the funnel skirt 160, or both the bottom surface 162 and funnel skirt 160. A funnel plug 180 may extend off of the bottom surface 162 and into an interior space defined by the funnel skirt 160 as illustrated in FIG. 2. The funnel plug 180 may be formed with the bottom surface 162 as illustrated or may be a separate component attached to the bottom surface 162.

According to various embodiments of the invention, pour openings 164 in a bottom surface 162 may act to allow product 914 to flow through such openings during a pouring state but they may also allow product 914 that is not poured from the pour cap 110 to flow back into an interior of the refill container 910 after use. In addition, according to various embodiments of the invention, pour openings 164 may be positioned, sized, and designed to control the flow rate of a product 914 being dispensed by the pour cap 110 in a use state. Depending on the expected viscosity and other characteristics of a fluid product 914, pour openings 164 may be formed in the pour cap 110 to control the flow rate and provide a desired flow rate to improve consumer experience with the pour cap 110 and closure system 100.

The pour cap 110 may also include a plug seal 150 extending off a surface of the funnel skirt 160. A plug seal 150 may include a conical skirt extending off the funnel skirt 160 between the funnel skirt 160 and the closure skirt 120. A container rim space 152 may be formed between the plug seal 150 and an inner surface of the closure skirt 120. The container rim space 152 may be configured to accept a rim of an opening 912 of a refill container 910. When the pour cap 110 is attached to the refill container 910, the plug seal 150 seals against the inner surface of the opening 912 of the refill container 910 to help prevent or reduce leaks.

Pour caps 110 according to various embodiments of the invention include an attachment system to facilitate attachment of the pour cap 110 to a refill container 910. As illustrated in FIG. 2, a thread 122 on an interior surface of the closure skirt 120 may be configured to thread, or screw, onto a refill container 910 having a corresponding thread on a neck thereof. Such attachment systems are well known, as are others. While various embodiments of the invention are shown with threaded attachment systems, it is understood that other attachment systems could also be used. For example, a bayonet system or snap fit system could be used. In other embodiments, a pour cap 110 could be welded or otherwise permanently attached to a refill container 910.

A funnel skirt 160 may also include a funnel attachment system on an interior surface of the funnel skirt 160. As illustrated in FIG. 2, a funnel attachment system may include a funnel skirt thread 168 configured to cooperate with a funnel thread 268 on a funnel 200. The funnel skirt thread 168 and funnel thread 268 may rotate or screw together to secure the funnel 200 to the pour cap 110. In some embodiments, the funnel attachment system also provides a seal between the funnel 200 and the pour cap 110 such that when secured together, fluid is unable to pass by the funnel attachment system.

In some embodiments of the invention, a portion of the funnel skirt 160 may be adapted to seal against or with one or more seal beads 266 on a funnel 200. A seal bead 266 may be positioned on an exterior surface of a wall 210 of the funnel 200 as illustrated in FIGS. 1 and 2. Although FIGS. 1 and 2 illustrated two seal beads 266 encompassing the wall 210 of the funnel 200 in a location adjacent an upper portion of the funnel 200, it is understood that seal beads 266 may be located anywhere along the wall 210 of the funnel 200 such that their position will enable a sealing connection against an interior surface of the funnel skirt 160 of the pour cap 110. In addition, a single seal bead 266 may be sufficient or multiple seal beads 266 may be used. In still other embodiments, a seal bead 266 may be located on an interior surface of the funnel skirt 160 and may contact or seal with a portion of the exterior surface of the wall 210 or the funnel 200.

As illustrated in FIG. 2, a portion of the funnel plug 180 may also engage an interior surface of the wall 210 of the funnel 200, creating a seal or a barrier to prevent fluid or product from flowing past the contact between the funnel 200 and pour cap 110 about the funnel plug 180.

A funnel 200 according to various embodiments of the invention is illustrated in FIGS. 1 and 2. According to certain embodiments of the invention, a funnel 200 may have a funnel shape with a first funnel opening 201 and a second funnel opening 202, the first funnel opening 201 having a larger diameter or size than the second funnel opening 202. A wall 210 of the funnel 200 generally creates a funnel shape extending from the first funnel opening 201 to the second funnel opening 202. In some embodiments of the invention, the wall 210 of the funnel 200 may terminate at an inner funnel edge 212 adjacent the first funnel opening 201 and a funnel cone 216 may extend away from the inner funnel edge 212 to an outer funnel edge 214. The funnel cone 216 may be a hollow cone shape or it may have slightly sloped walls. As illustrated in FIG. 2, the funnel cone 216 provides an additional interior space that may be used to hold product being poured into the funnel 200 so that such product does not overflow the space within the funnel 200. The funnel cone 216 may also provide a lip or surface against which a portion of the pour cap 110 may be rested when product is being poured through the pour cap 110 into the funnel 200.

The wall 210 of the funnel 200 may be configured, shaped, or otherwise formed such that it can be placed in an opening of a target container 990 in a secure or stable manner. According to various embodiments of the invention, a wall 210 size and shape may be configured based on the opening size of a target container 990 into which product 914 is to be poured from a refill container 910.

A funnel 200 according to embodiments of the invention is shaped and configured to sit in or attach to the pour cap 110. As illustrated in FIG. 2, a funnel 200 may include a funnel thread 268 that mates with or cooperates with the funnel skirt thread 168 to secure the funnel 200 to the pour cap 110 in a closed or non-use position.

One or more seal beads 266 on an exterior surface of the wall 210 of the funnel 200 may sit against, contact, or otherwise seal against an interior surface of the funnel skirt 160 of the pour cap 110 as illustrated. Inclusion of the seal beads 266 may assist in the prevention of product leakage or discharge in a closed or non-use position.

Figure 3:
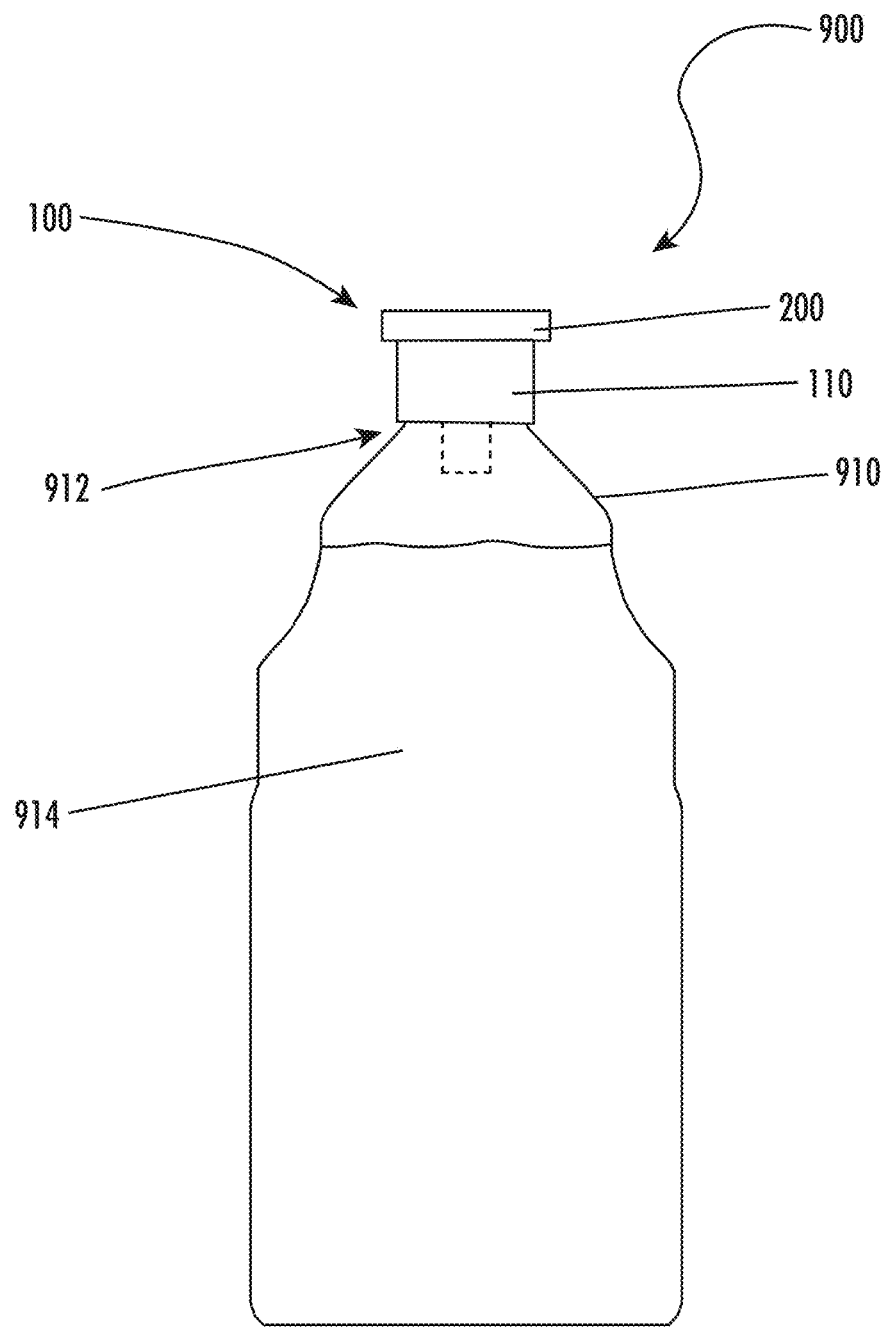
FIG. 3 illustrates a closure system on a refill container according to certain embodiments of the invention.

According to embodiments of the invention, the closure system 100 illustrated in FIGS. 1 and 2 may be attached to a refill container 910 containing a product 914 as illustrated in FIG. 3. In the closed position, or non-use state, illustrated in FIG. 3, the funnel 200 is connected to or secured with the pour cap 110 creating at least one seal therewith such that if the refill container 910 is turned on its side or inverted, product 914 stored in the refill container 910 will not be dispensed from—or leak from—the closure system 100.

As illustrated in FIG. 3, a refill product 900 may include a refill container 910 having an opening 912, a closure system 100 attached to the opening 912, and a product 914 contained in the refill container 910. The refill container 910 may be any type of container, bottle, or pouch and may be made of glass, plastic, paper, or other material as desired. The refill container 910 may also be of any shape or size desired. The opening 912 in the refill container 900 may be of any size, including standard sizes commonly found on bottles and containers used with consumer products and goods.

While any various liquids, powders, or other flowable substances may be used with embodiments of the invention, many products 914 may include a product that is selected from soaps, laundry detergents, cleaners, cleaning agents, lotions, make-up, beauty treatments, pesticides, insecticides, fertilizers, food stuffs, and liquid nutrients.

Figure 4:
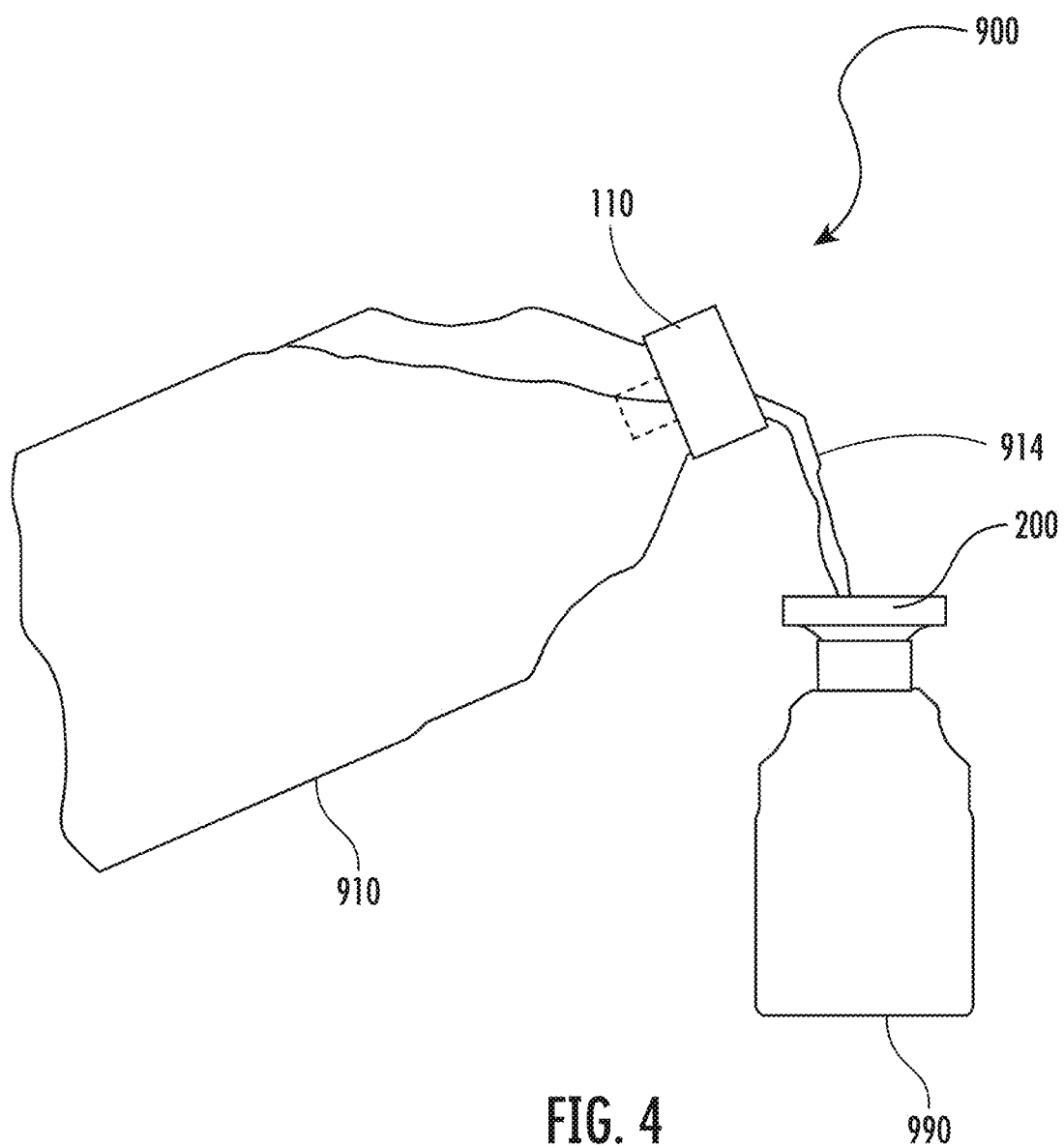
FIG. 4 illustrates a closure system in use according to certain embodiments of the invention.

FIG. 4 illustrates an open position, or use state, of the closure system 100 along with a target container 990 into which it is desired to dispense product 914. As illustrated, the funnel 200 has been removed from the pour cap 110 such that the product 914 may be poured from one or more pour openings 164 without the funnel 200 stopping the flow of the product 914. In such open position, or use state, the funnel 200 is inserted into an opening of a target container 990 into which it is desired to dispense product 914 from the refill container 910. The refill container 910 may be moved and tipped to allow product 914 to flow through the pour cap 110 with the pour cap 110 positioned over the funnel 200 such that product 914 exiting the pour cap 110 flows into the funnel 200 and into the target container 990.

In some embodiments of the invention, a funnel 200 may also include one or more vent openings formed in the wall 210 to allow air to escape the target container 990 during filling of the target container 990 using the closure system 100. The vent locations in the wall 210 may be customized or positioned based upon the intended use for the system and the size and configuration of the target container 990.

Figure 5:
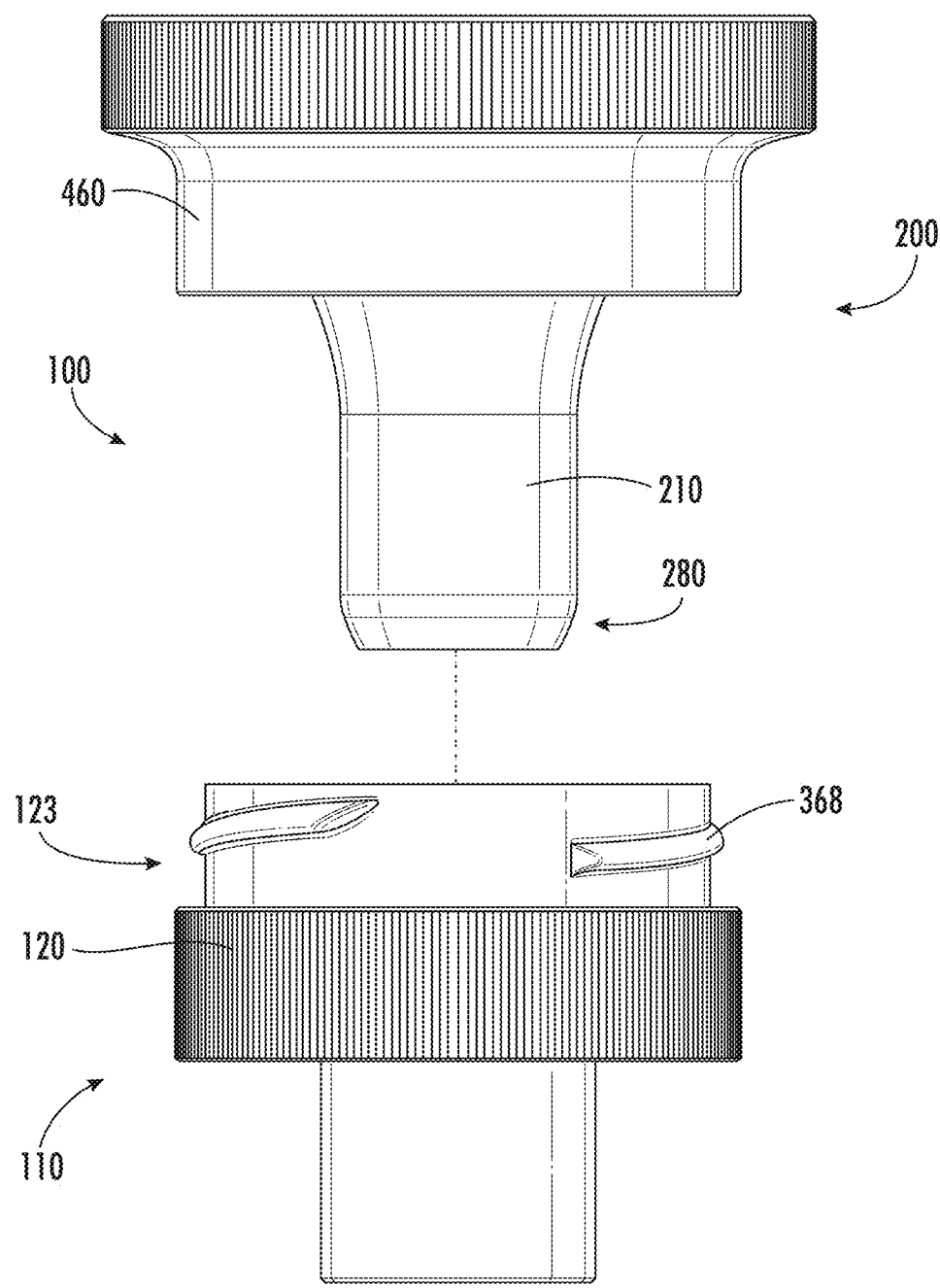
FIG. 5 illustrates a closure system according to various embodiments of the invention.
Figure 6:
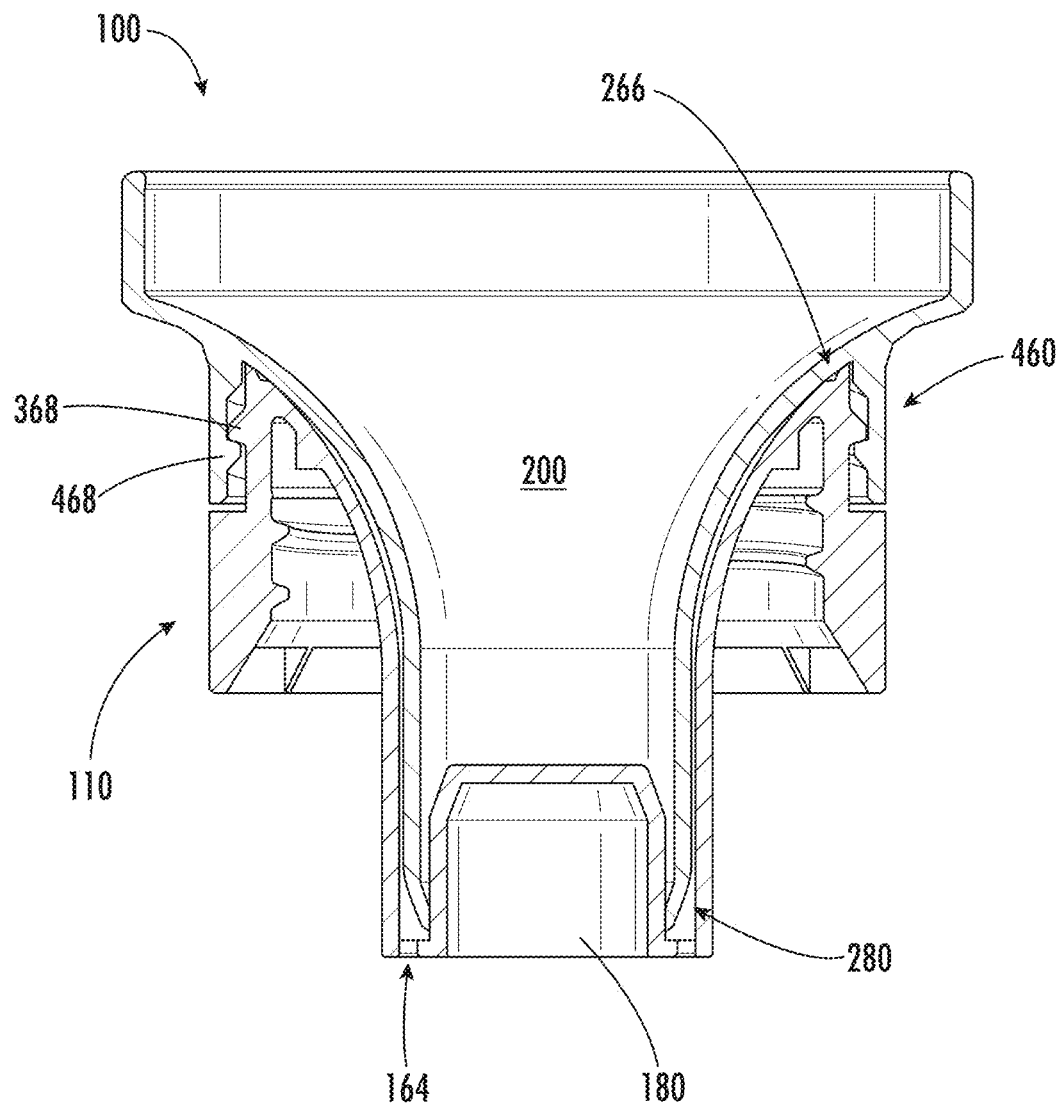
FIG. 6 illustrates a cross-sectional view of the closure system illustrated in FIG. 5 in an assembled state.

A closure system 100 according to other embodiments of the invention is illustrated in FIGS. 5 and 6. As illustrated in FIG. 5, a closure system 100 may include a funnel 200 and a pour cap 110 having similar features as other embodiments. However, the funnel attachment system of the embodiments illustrated in FIGS. 5 and 6 may be positioned in a different location on the closure system 100.

As illustrated, a funnel attachment system according to some embodiments of the invention may include an exterior thread 368 on the pour cap 110 capable of mating with a funnel thread 468 on an attachment skirt 460 of a funnel 200. A pour cap 110 closure skirt 120 may include a recessed exterior surface 123 having an exterior thread 368 positioned thereon. The funnel 200 may include an attachment skirt 460 extending downward off a portion of the funnel wall 210 or other part of the funnel 200. The attachment skirt 460 has a funnel thread 468 on an interior surface thereof which may engage the exterior thread 368 of the pour cap 110 to secure the funnel 200 to the pour cap 110.

The attachment skirt 460 illustrated in FIGS. 5 and 6 extends partially over or covers an exterior surface of the recessed exterior surface 123 of the closure skirt 120. While the attachment skirt 460 illustrated only extends partially over the closure skirt 120, it is understood that in other embodiments of the invention, the attachment skirt 460 may extend over a greater exterior surface of the closure skirt 120 or the recessed exterior surface 123 may extend further along the closure skirt 120. For example, in some embodiments, a recessed exterior surface 123 may include the entire external surface of the closure skirt 120 and the attachment skirt 460 may extend over and cover the entire recessed exterior surface 123 in a closed position. This may be desired, for example, to prevent torquing of the closure skirt 120 by a user as the user attempts to remove the funnel 200 from the pour cap 110. The extension of an attachment skirt 460 over the entire exterior surface of the closure skirt 120 may help prevent such disengagement of the pour cap 110 when removing a funnel 200 therefrom.

While the funnel attachment system illustrated in FIGS. 5 and 6 includes a threaded system, it is understood that other attachment features could be incorporated into the attachment system in place of the corresponding threads. For example, a bayonet attachment system or snap attachment system could be substituted for the exterior thread 368 and funnel thread 468 in such a manner that the funnel 200 and pour cap 110 could be attached and secured to each other using such an alternative attachment system.

A funnel 200 may also include a chamfered edge 280 adjacent the second funnel opening 202 as illustrated in FIGS. 5 and 6. The chamfered edge 280 may be configured to engage the funnel plug 180 and form a seal therewith. As illustrated in FIG. 6, the chamfered edge 280 of the funnel 200 curls inward to engage an exterior surface of the funnel plug 180. When funnel 200 is threaded onto the pour cap 110, the second funnel opening 202 engages the funnel plug 180 and moves along a surface thereof with the chamfered edge 280 of the funnel 200 creating a seal against a surface of the funnel plug 180. The contact or seal formed between the funnel plug 180 and the funnel 200 prevents leakage of a product past the contact or seal, preventing inadvertent loss of product 914 from a refill container 910 to which the closure system 100 is attached.

A funnel 200 may also include a seal bead 266 that is positioned close to the top edge 112 of the pour cap 110 adjacent the thread attachment in a closed position or non-use state as illustrated in FIG. 6. The positioning of a seal bead 266 adjacent the top edge 112 of the pour cap 110 helps ensure a tight seal between the funnel 200 and the pour cap 110 when the funnel 200 is threaded onto the pour cap 110.

Figure 7:
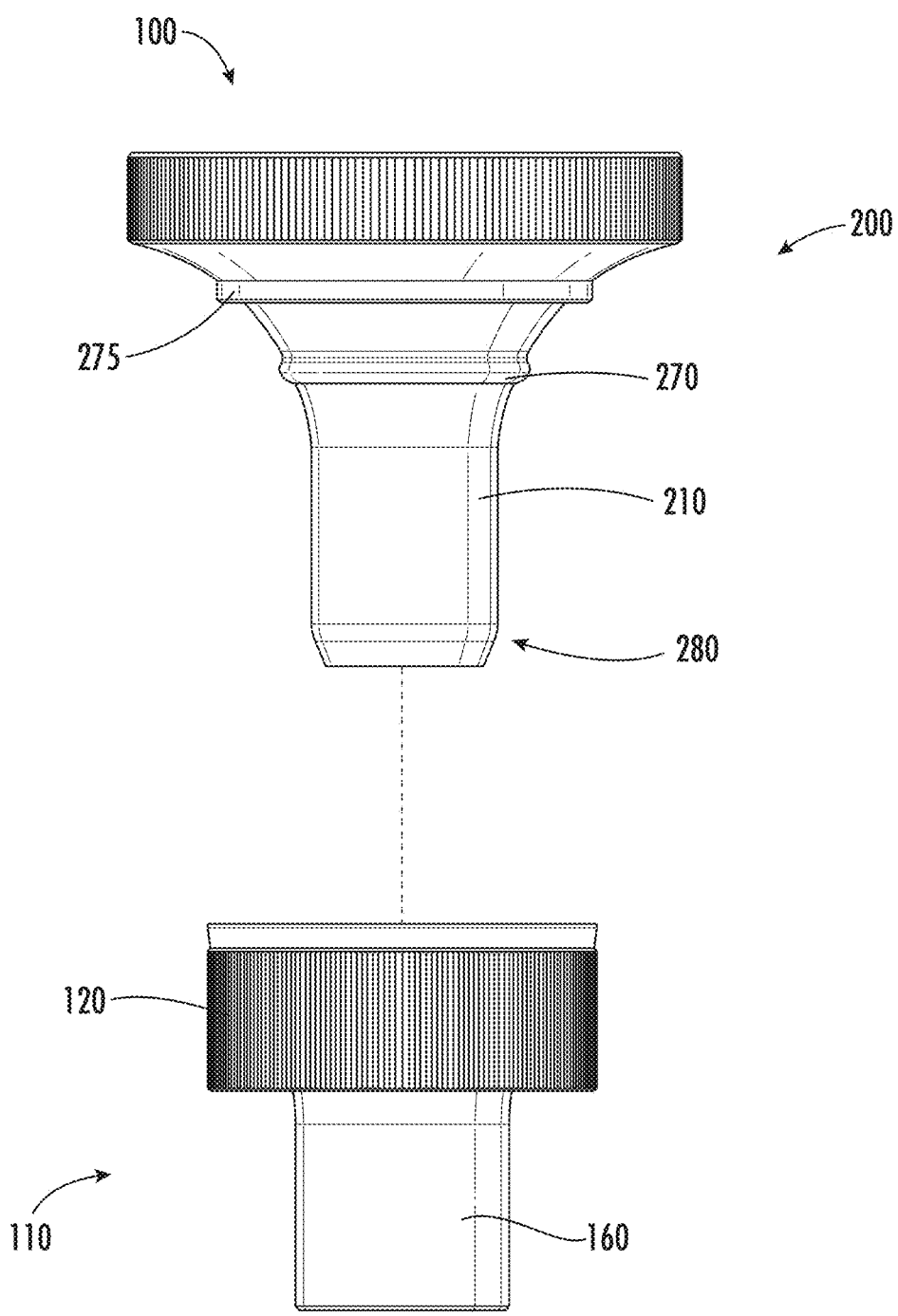
FIG. 7 illustrates a closure system according to various embodiments of the invention.
Figure 8:
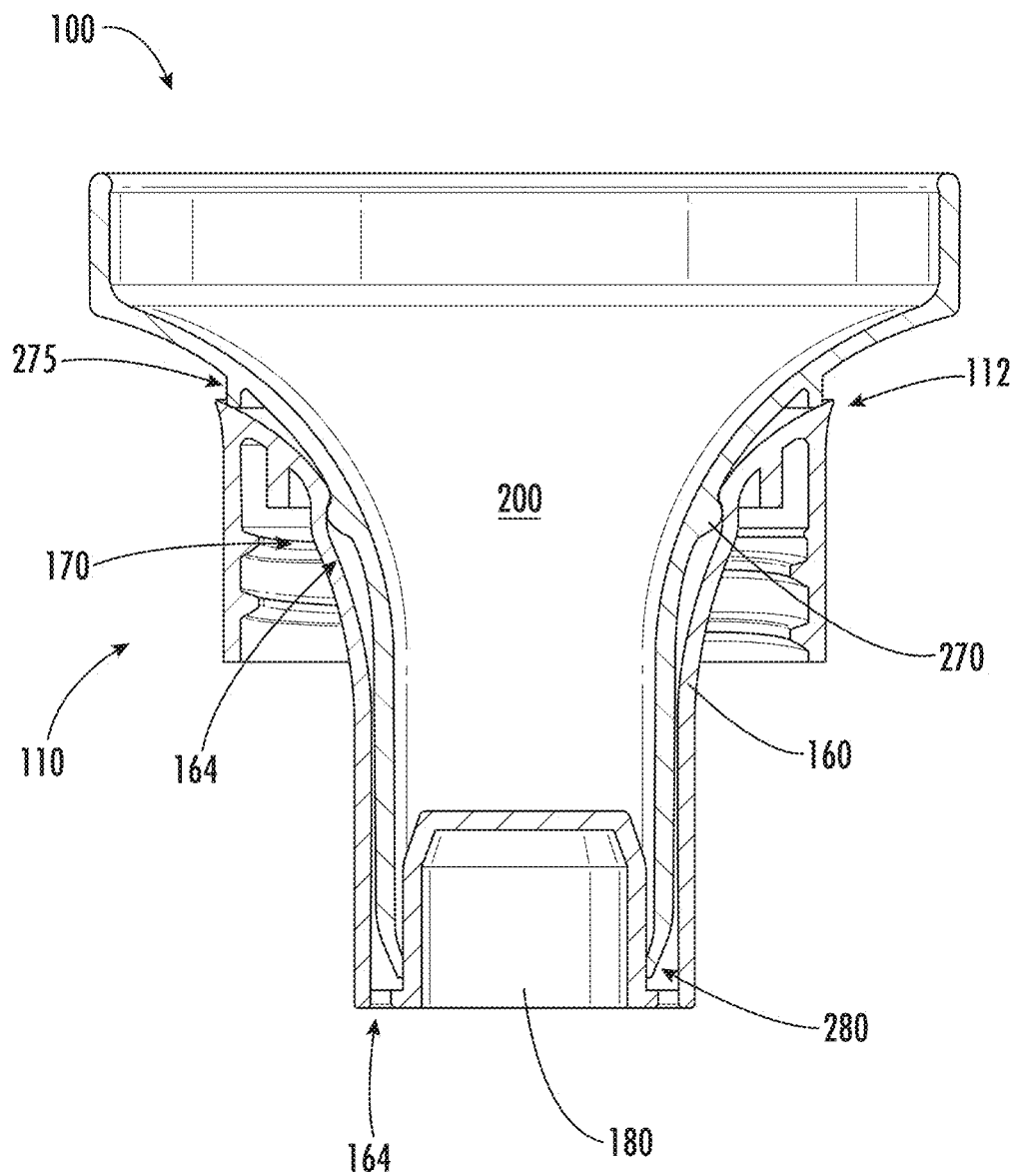
FIG. 8 illustrates a cross-sectional view of the closure system illustrated in FIG. 7 in an assembled state.

A closure system 100 according to still other embodiments of the invention is illustrated in FIGS. 7 and 8. As with other embodiments, the closure system 100 includes a pour cap 110 and a funnel 200. However, the funnel attachment system includes a retaining bead 270 on an exterior surface of the wall 210 of the funnel 200 and a corresponding retaining recess 170 on an interior surface of the funnel skirt 160 of the pour cap 110. The retaining bead 270 of the funnel 200 may snap into the retaining recess 170 of the pour cap 110, thereby retaining the funnel 200 on the pour cap 110 until sufficient force is applied to the funnel 200 to overcome the fit and retention of the retaining bead 270 and the retaining recess 170.

A funnel 200 may also include a stop skirt 275 extending off the wall 210 of the funnel 200 as illustrated in FIGS. 7 and 8. The stop skirt 275 may be positioned on the wall 210 such that when engaged with the pour cap 110, the stop skirt 275 may contact or engage an interior surface of the funnel skirt 160 adjacent the top edge 112 of the pour cap 110. The stop skirt 275 may engage the pour cap 110 when the funnel 200 has been fully inserted into the pour cap 110 such that the retaining bead 270 and the retaining recess 170 have been sufficiently engaged. In some embodiments of the invention, the stop skirt 275 may also provide a secondary seal between the funnel 200 and the pour cap 110 such that the stop skirt 275 may prevent leakage or the flow of product 914 from a refill container 910 when the closure system 100 is attached to the refill container 910 and the funnel 200 connected to the pour cap 110.

As with other embodiments, a funnel 200 may include a chamfered edge 280 which may seat over, or engage, a funnel plug 180 as illustrated. The engagement of the chamfered edge 280 of the funnel 200 and the funnel plug 180 of the pour cap 110 may create a seal between the funnel 200 and the pour cap 110 sufficient to prevent leakage and flow of product 914 between the funnel 200 and pour cap 110 when the funnel 200 is connected to the pour cap 110 as illustrated in FIG. 8.

Closure systems 100 illustrated in the drawings show various aesthetic designs of the funnel 200 and the pour cap 110. While certain aesthetic designs are illustrated, it is understood that the aesthetics of a closure system 100 according to various embodiments of the invention may be modified and customized as desired to create a shelf-presence or look that matches a brand or meets requirements of a customer. Furthermore, the aesthetic look of the top edge 112 of a pour cap 110 may also be configured to assist with the distribution of a product 914 through the pour cap 110. For instance, in some embodiments of the invention, the top edge 112 of the pour cap 110 may flare upwards or away from the closure skirt 120 to form a spout-looking portion of the pour cap 110, providing a visual cue for a user to pour product 914 from the pour cap 110 at the point of the spout-looking portion of the pour cap 110.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A refill system, comprising:
   a refill container;
   a product in the container;
   a closure system attached to the refill container, comprising:
      a pour cap, comprising:
         a closure skirt;
         a funnel skirt defining an interior space; and
         a funnel plug positioned in the interior space;
      a funnel, comprising:
         a funnel wall;
         a funnel attachment system; and
         a chamfered edge at a small end of the funnel;
      wherein the chamfered edge of the funnel engages an exterior surface of the funnel plug in a closed position.

2. The refill system of claim 1, wherein the funnel attachment system further comprises a threaded attachment system.

3. The refill system of claim 1, wherein the funnel attachment system further comprises a snap-fit attachment system.

4. A closure system, comprising:
   a pour cap, comprising:
      a closure skirt;
      a funnel skirt extending downwardly within the closure skirt and having a wall with an interior surface; and
      one or more pour openings in the funnel skirt;
   a funnel, comprising:
      a funnel wall having an exterior surface configured and arranged to mate with said interior surface of said funnel skirt wall when received in assembled relation; and
      a funnel attachment system;
   wherein the funnel attachment system attaches the funnel to the pour cap in a closed position.

5. The closure system of claim 4, wherein the funnel attachment system further comprises:
   a funnel skirt thread on said interior surface of the funnel skirt; and
   a funnel thread on the exterior surface of the funnel wall, wherein the funnel skirt thread and funnel thread are engaged in the closed position.

6. The closure system of claim 4, wherein the funnel attachment system further comprises:
an exterior thread on an exterior surface of the closure skirt;
an attachment skirt extending off the funnel wall; and
a funnel thread on an interior surface of the attachment skirt,
wherein the funnel thread and exterior thread are engaged in the closed position.

7. The closure system of claim 4, wherein the funnel attachment system further comprises:
a retaining recess in an interior surface of the funnel skirt; and
a retaining bead on an external surface of the funnel wall, wherein the retaining bead sits in the retaining recess in the closed position.

8. The closure system of claim 7, further comprising a stop skirt extending off an external surface of the funnel wall, wherein the stop skirt contacts the pour cap in a closed position and is not in contact with the pour cap in an open position.

9. The closure system of claim 4, further comprising at least one seal bead on an external surface of the funnel wall, wherein the at least one seal bead seals against an internal surface of the funnel skirt in the closed position.

10. The closure system of claim 4, further comprising a plug seal extending off of an exterior surface of the funnel skirt adjacent an interior surface of the closure skirt.

11. The closure system of claim 4, further comprising:
a bottom surface at an end of the funnel skirt
wherein said one or more pour openings in said funnel skirt comprises one or more openings in said bottom surface.

12. The closure system of claim 4, further comprising:
a bottom surface at an end of the funnel skirt; and
a funnel plug extending upwardly from the bottom surface into an interior space defined by the interior surface of the wall of the funnel skirt.

13. The closure system of claim 4, further comprising:
a bottom surface at an end of the funnel skirt;
a funnel plug extending upwardly from the bottom surface into an interior space defined by the interior surface of the wall of the funnel skirt; and
a chamfered edge at a small end of the funnel, wherein the chamfered edge seals to an exterior surface of the funnel plug in a closed position.

14. A method of refilling a container, comprising:
providing a target container comprising a container opening;
providing a refill product, the refill product comprising:
a refill container comprising a refill container opening;
a product stored in the refill container;
a pour cap attached to the refill container opening, the pour cap comprising a closure skirt, a funnel skirt extending downwardly within the closure skirt and having a wall with an interior surface, and one or more pour openings in the funnel skirt; and
a funnel attached to the pour cap, the funnel comprising a funnel wall having an exterior surface configured and arranged to mate with said interior surface of said funnel skirt wall when received in assembled relation, and a funnel attachment system, wherein the funnel attachment system attaches the funnel to the pour cap in a closed position;
removing the funnel from the pour cap;
inserting the funnel in the target container opening;
pouring the product from the refill container through the pour cap and into the funnel;
removing the funnel from the target container opening; and
reattaching the funnel to the pour cap.

15. The method of claim 14, further comprising:
removing a dispenser from the target container opening prior to inserting the funnel in the target container opening; and
reattaching the dispenser to the target container opening after removing the funnel from the target container opening.

16. The method of claim 14, wherein removing the funnel from the pour cap further comprises unscrewing the funnel from the pour cap.

17. The method of claim 14, wherein the product stored in the refill container is a liquid soap.

18. The method of claim 14, wherein the product stored in the refill container is a lotion.

19. The method of claim 14, wherein the product stored in the refill container is a powder.

20. A refill system, comprising:
a refill container;
a product in the container;
a closure system attached to the refill container, comprising:
a pour cap, comprising:
a closure skirt;
a funnel skirt defining an interior space; and
a funnel plug positioned in the interior space;
a funnel, comprising:
a funnel wall;
a funnel attachment system to attach the funnel to the pour cap to seal one or more openings in the pour cap.

* * * * *